(12) United States Patent
Wu

(10) Patent No.: US 9,266,753 B2
(45) Date of Patent: Feb. 23, 2016

(54) FLUID MIXING DEVICE

(71) Applicant: Chao-Chung Wu, Taichung (TW)

(72) Inventor: Chao-Chung Wu, Taichung (TW)

( * ) Notice: Subject to any disclaimer, the term of this patent is extended or adjusted under 35 U.S.C. 154(b) by 191 days.

(21) Appl. No.: 14/252,217

(22) Filed: Apr. 14, 2014

(65) Prior Publication Data

US 2015/0291457 A1 Oct. 15, 2015

(51) Int. Cl.
*B01F 3/04* (2006.01)
*C02F 1/50* (2006.01)
*B01F 5/04* (2006.01)
*C02F 1/78* (2006.01)

(52) U.S. Cl.
CPC ............... *C02F 1/50* (2013.01); *B01F 3/04099* (2013.01); *B01F 3/04503* (2013.01); *B01F 5/0428* (2013.01); *B01F 2003/04886* (2013.01); *C02F 1/78* (2013.01); *C02F 2201/005* (2013.01); *C02F 2201/784* (2013.01); *C02F 2303/02* (2013.01); *C02F 2307/06* (2013.01)

(58) Field of Classification Search
CPC ........... B01F 3/04; B01F 3/04099; C02F 1/78
USPC ......................... 261/76, 77, DIG. 75; 239/445
See application file for complete search history.

(56) References Cited

U.S. PATENT DOCUMENTS 5,573,186 A * 11/1996 Loschelder ............. E03C 1/023
239/445

* cited by examiner

*Primary Examiner* — Robert A Hopkins

(57) ABSTRACT

A fluid mixing device includes a body, a water controlling valve assembly and a Venturi tube structure. The body is internally formed with inlet channels for communicating with water source, a first channel, an outlet channel communicating between the first channel and outside of the body, and a gassing channel communicating between the first channel and a gas source. The water controlling valve is operable between first and second positions. The Venturi tube structure is disposed within the first channel and includes a necked passage communicating with the first channel and a gassing hole communicating between the necked passage and the gassing channel. When the water controlling valve is located in the first position, the water flow passes through the necked passage and draws gas from the gas source through the gassing hole to come into the necked passage to mix with each other.

10 Claims, 6 Drawing Sheets

FLUID MIXING DEVICE

BACKGROUND OF THE INVENTION

1. Field of the Invention

The present invention relates to a fluid device, and more particularly to a fluid mixing device.

2. Description of the Prior Art

With the improving of human life, food hygiene requirement becomes stricter. People usually use ozone added in water to wash fruit, meat and dishes, because the water added with ozone has a specific function, and the ozone reduces to oxygen after a period of time, so that it also contributes to environmental protection. A fluid mixing device for adding the ozone is provided on the market. This kind of fluid mixing device is disclosed in TWM292419, TWI312045 and so on.

However, the water mixes with the ozone when it outputs to the water outlet in conventional techniques, so that the mixing efficiency is too poor to mix the water with the ozone. While the performance of the ozone water including sterilization, odor, detoxification and bleaching depends on the ratio the water mixes with the ozone, so when the ratio is too low, it highly affects the performance, and this disadvantage is needed to be improved.

The present invention has arisen to mitigate and/or obviate the afore-described disadvantages.

SUMMARY OF THE INVENTION

The primary object of the present invention is to provide a fluid mixing device, the fluid mixing device is switchable for adding a gas (such as ozone) or not, and it depends on a demand. The fluid mixing device includes a Venturi tube structure, and it helps the gas mix with the water with a high efficiency, and the content of the gas in the water is increased to achieve the demand function.

To achieve the above object, a fluid mixing device in accordance with present invention includes a body, a water controlling valve assembly and a Venturi tube structure. The body is internally formed with inlet channels for communicating with water source, a first channel, an outlet channel communicating between the first channel and outside of the body, and a gassing channel communicating between the first channel and a gas source. The water controlling valve assembly includes a shell fluid-sealingly assembled on the body and a water controlling valve disposed in the shell. The shell is formed with entrances and a first exit. The entrances communicate with the inlet channel, and the first exit communicates with the first channel. The water controlling valve is operable between a first position and a second position to control the flow of the water source to flow out through the first exit. The Venturi tube structure is disposed within the first channel and includes a necked passage communicating with the first channel and a gassing hole communicating between the necked passage and the gassing channel. When the water controlling valve is located in the first position, the interior of the water controlling valve communicates with the first exit, and the water flow passes through the necked passage and draws gas from the gas source through the gassing hole to come into the necked passage to mix with each other. When the water controlling valve is disposed in the second position, the interior of the water controlling valve is uncommunicated with the first exit.

DETAILED DESCRIPTION OF THE PREFERRED EMBODIMENTS

Figures 1, 1A:
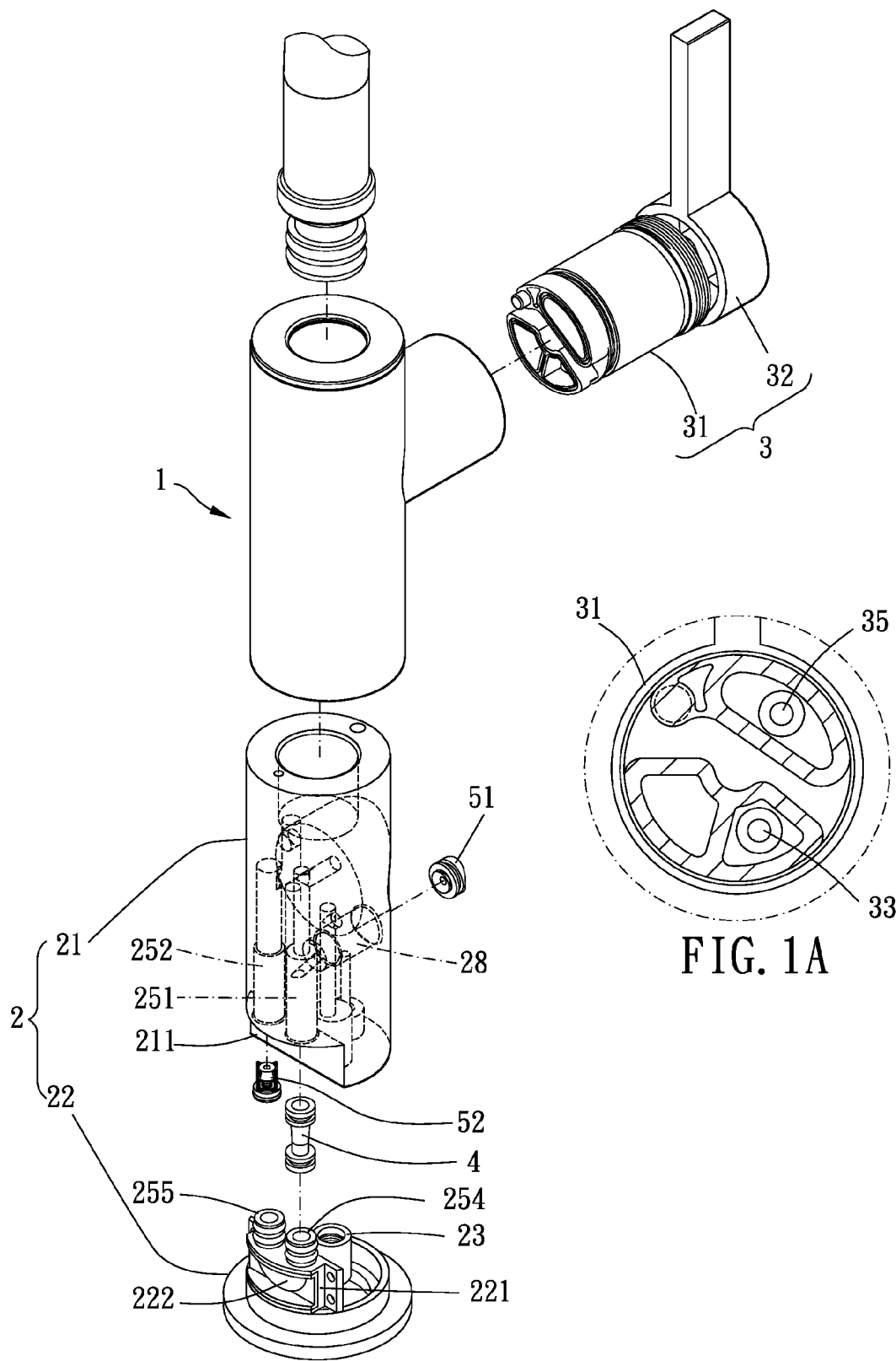
FIG. 1 is a breakdown drawing of a fluid mixing device in accordance with a first embodiment of the present invention.
FIG. 1a is a partial radial cross-sectional drawing of the fluid mixing device in accordance with the first embodiment of the present invention.
Figure 2:
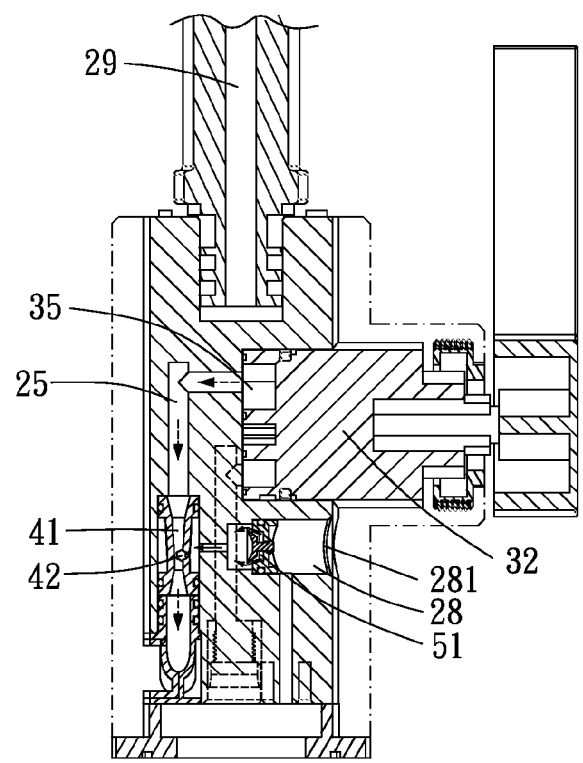
FIG. 2 is a first axial cross-sectional drawing of the fluid mixing device in accordance with the first embodiment of the present invention.
Figure 3:
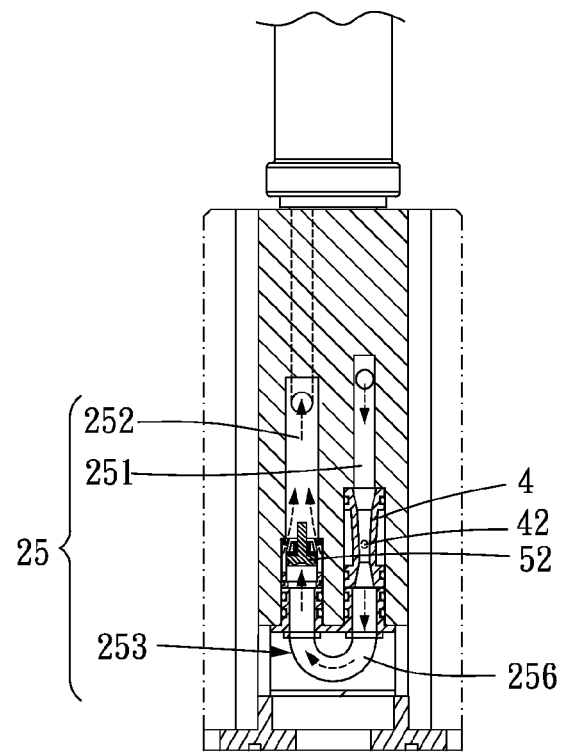
FIG. 3 is a second axial cross-sectional drawing of the fluid mixing device in accordance with the first embodiment of the present invention.
Figure 4:
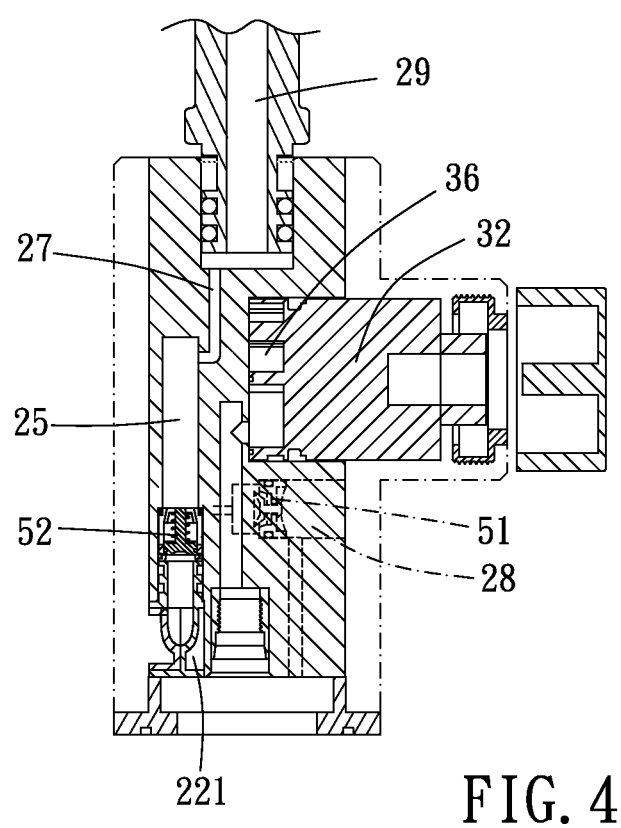
FIG. 4 is a third axial cross-sectional drawing of the fluid mixing device in accordance with the first embodiment of the present invention.

The present invention will be clearer from the following description when viewed together with the accompanying drawings, which show, for purpose of illustrations only, the preferred embodiment in accordance with the present invention.

Referring to FIGS. 1-4, a fluid mixing device in accordance with a preferred embodiment of the present invention comprises a body 2, a water controlling valve assembly 3 and a Venturi tube structure 4.

The body 2 includes a main portion 21 and a bottom member 22 detachably assembled with the main portion 21. The body 2 is internally formed with at least one inlet channel 23 for communicating with at least one water source, a first channel 25, an outlet channel 27 communicating between the first channel 25 and outside of the body, and a gassing channel 28 communicating between the first channel 25 and a gas source (such as ozone). The bottom member 22 is formed with an opening of the at least one inlet channel 23 and an opening of the gassing channel 28.

The water controlling valve assembly 3 includes a shell 31 fluid-sealingly assembled on the body 2 and a water controlling valve 32 disposed in the shell 31. The shell 31 is formed with at least one entrance 33 and a first exit 35 (shown in FIG. 1a). The at least one entrance 33 communicates with the at least one inlet channel 23, and the first exit 35 communicates with the first channel 25. The water controlling valve 32 is operable between a first position and a second position (take FIG. 1 as an example, the first position is where the water controlling valve 32 turning in left, the second position is where the water controlling valve 32 turning in right) to control the flow of the water source to flow out from the interior of the water controlling valve 32 via the first exit 35.

The Venturi tube structure 4 is disposed within the first channel 25 and includes a necked passage 41 communicating with the first channel 25 and a gassing hole 42 communicating between the necked passage 41 and the gassing channel 28. When the water flow passes through the necked passage 41 communicating with the first channel 25, the necked passage 41 has a smaller cross-sectional surface and communicates with the gassing channel 28, so that the gas in the gassing channel 28 is drawn into the necked passage 41. So the gas is added into the water and increases the gas content in the water.

It is noted that, the first channel 25 includes a first portion 251, a second portion 252 and an arcuate portion 253 connecting between the first portion 251 and the second portion 252. The first portion 251 communicates with the first exit 35 at one end, and the second portion 252 communicates with the outlet channel 27 at one end. The arcuate portion 253 is disposed on the bottom member 22 of the body 2, and the bottom member 22 is formed with a chunk member 221. Specifically, the main portion 21 is formed with an undercut portion 211, and the chunk member 221 is assembled in the undercut portion 211. The arcuate portion 253 includes an entrance tubular section 254, an exit tubular section 255 and a middle arcuate section 256 connecting between the entrance tubular section 254 and the exit tubular section 255. The entrance tubular section 254 and the exit tubular section 255 are disposed on the chunk member 221 and respectively connected with the first portion 251 and the second portion 252. A shell member 222 is detachably assembled with the chunk member 221 and constructs the middle arcuate section 256 with the chunk member 221. It is noted that, an ordinary machining method for a bending channel is using a turning lathe to machine a part to be an U-shaped middle arcuate section. This kind of machining method is unable to machine the channel to be circular. When a fluid flows in the channel and passes through the middle arcuate section, the fluid collides with the wall, so that the speed of the fluid slows down. And the fluid flowing through the exit is unstable. So that it takes a lot of time and is unable to achieve a demand function. It is noted that, in the present invention the chunk member 221 is machined with an U-shaped cavity (not shown), and the shell member 222 is also machined with a corresponding U-shaped cavity. And when the chunk member 221 and the shell member 222 are assembled together, two the U-shaped cavity form the middle arcuate section 256. The design of the arcuate portion 253 reduces the collision between the fluid and the wall when the fluid flows through the arcuate portion 253. So that the fluid flows faster and the flowing of the fluid is stable, and the Venturi tube structure 4 has a good performance of adding the gas.

Figure 5:
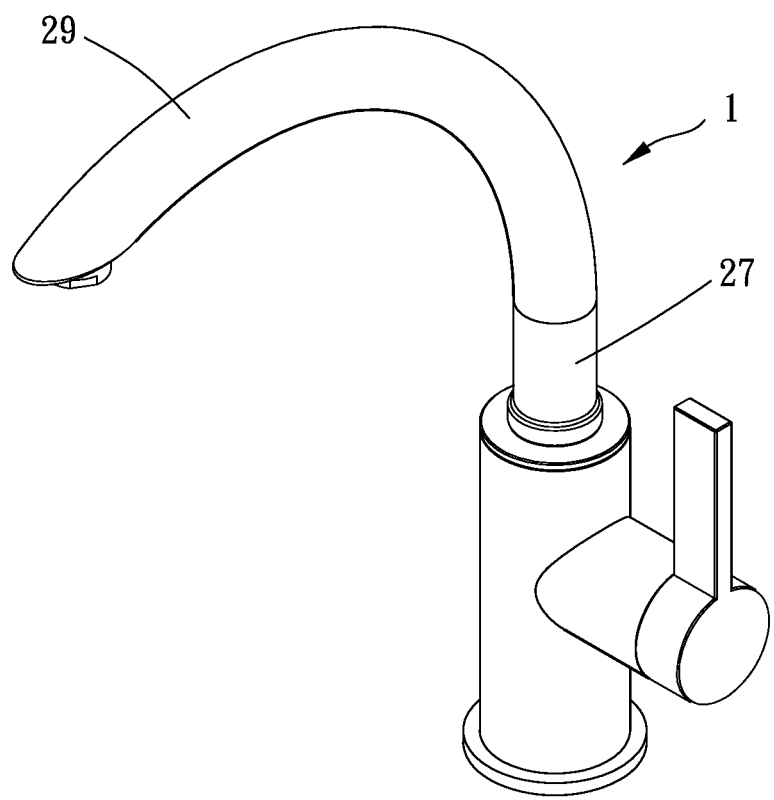
FIG. 5 is a three-dimensional drawing of the fluid mixing device in accordance with the first embodiment of the present invention.

Please refer to FIG. 5 for a three-dimensional drawing of the fluid mixing device 1 in accordance with a first embodiment of the present invention. The fluid mixing device 1 includes an outflow tubular member 29 detachably assembled to the body, and the interior of the outflow tubular member 29 communicates with the outlet channel 27. The water flows out through the outflow tubular member 29. It is noted that, the fluid mixing device 1 may be a faucet, and it is disposed in a shower, a kitchen or a toilet for water washing equipment.

Specifically, when the water controlling valve 32 is located in the first position, the interior of the water controlling valve 32 communicates with the first exit 35. The water flows through the first exit 35 and flows into the first portion 251 of the first channel 25 (as indicated by the arrow shown in FIGS. 2, 3). The water passes through the necked passage 41 and draws gas from the gas source through the gassing hole 42 to come into the necked passage 41 to mix with each other. The water mixed with high concentration of gas flows into the arcuate portion 253 of the first channel 25 and the second portion 252. Then the water flows into the outflow tubular member 29 through the outlet channel 27 and flows out of the fluid mixing device 1.

Preferably, a first check valve 51 and a second check valve 52 are included in this invention. The first check valve 51 is disposed in the body 2 and inside the gassing channel 28 to only allow a flow to flow toward the first channel 25. The first check valve 51 prevents the water from flowing into the gassing hole 28 and damaging the device supplying a gas source. The gassing channel 28 is preferably formed with a blocking member 281 at one end distant from the gassing hole 42, and the blocking member 281 blocks the gassing channel 28 to prevent the gas from leaking to outside. The second check valve 52 is disposed in the body 2 and inside the first channel 25, and the second check valve 52 is disposed between the outlet channel 27 and the necked passage 41 to only allow a flow to flow toward the outlet channel 27. Specifically, the outlet channel 27 communicates with the first channel 25, and the second check valve 52 prevents the water from reversely flowing through the first channel 25. The horizontal position of the second check valve 52 is equal to or lower than that of the gassing hole 42. The pressure caused by the water in the second portion 252 of the first channel 25 is stopped by the second check valve 52, so that a water pressure of the gassing hole 42 is greater than that of the second check valve 52 and the water tends to flow from the first portion 251 to the second portion 252. The design of preventing the water from flowing from the second portion 252 to the first portion 251 reduces the possibility that the water flows into the gassing channel 28.

Figure 6:
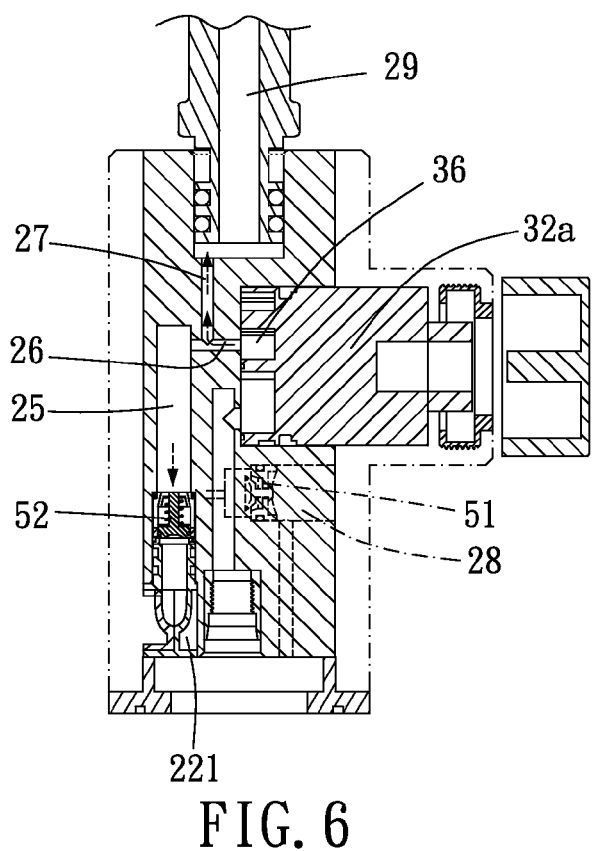
FIG. 6 is an axial cross-sectional drawing of the fluid mixing device in accordance with a second embodiment of the present invention.
Figure 6A:
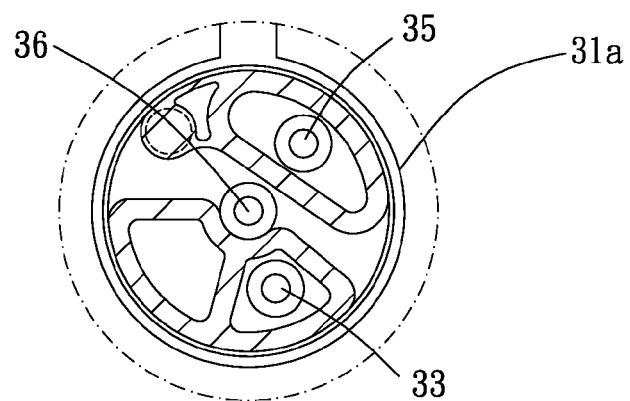
FIG. 6a is a partial radial cross-sectional drawing of the fluid mixing device in accordance with the second embodiment of the present invention.

Please refer to FIGS. 6, 6a for a second embodiment of the present invention. Compared to the first embodiment, the body is formed with a second channel 26 internally, and the second channel 26 communicates with the outlet channel 27. The shell 31a is formed with a second exit 36, and the second exit 36 communicates with the second channel 26. When the water controlling valve 32a is located in the second position, the interior of the water controlling valve 32a communicates with the second exit 36. The water flows into the second channel 26 through the second exit 36 and then flows into the outlet channel 27 (as indicated by the arrow shown in FIG. 6). The water finally flows into the outflow tubular member 29 through the outlet channel 27 and flows out the fluid mixing device. When the water controlling valve 32a is disposed in the middle of the first position and the second position, the interior of the water controlling valve 32a is uncommunicated with the first exit 35 and the second exit 36. So that the water is unable to flow out through the first exit 35 and the second exit 36. And the rest of the function is the same as the first embodiment. Compared to the first embodiment, the second embodiment includes the first exit 35, the second exit 36 and the second channel 26 and is selectable to add the gas into the water flowing to outside.

Figures 7, 7A:
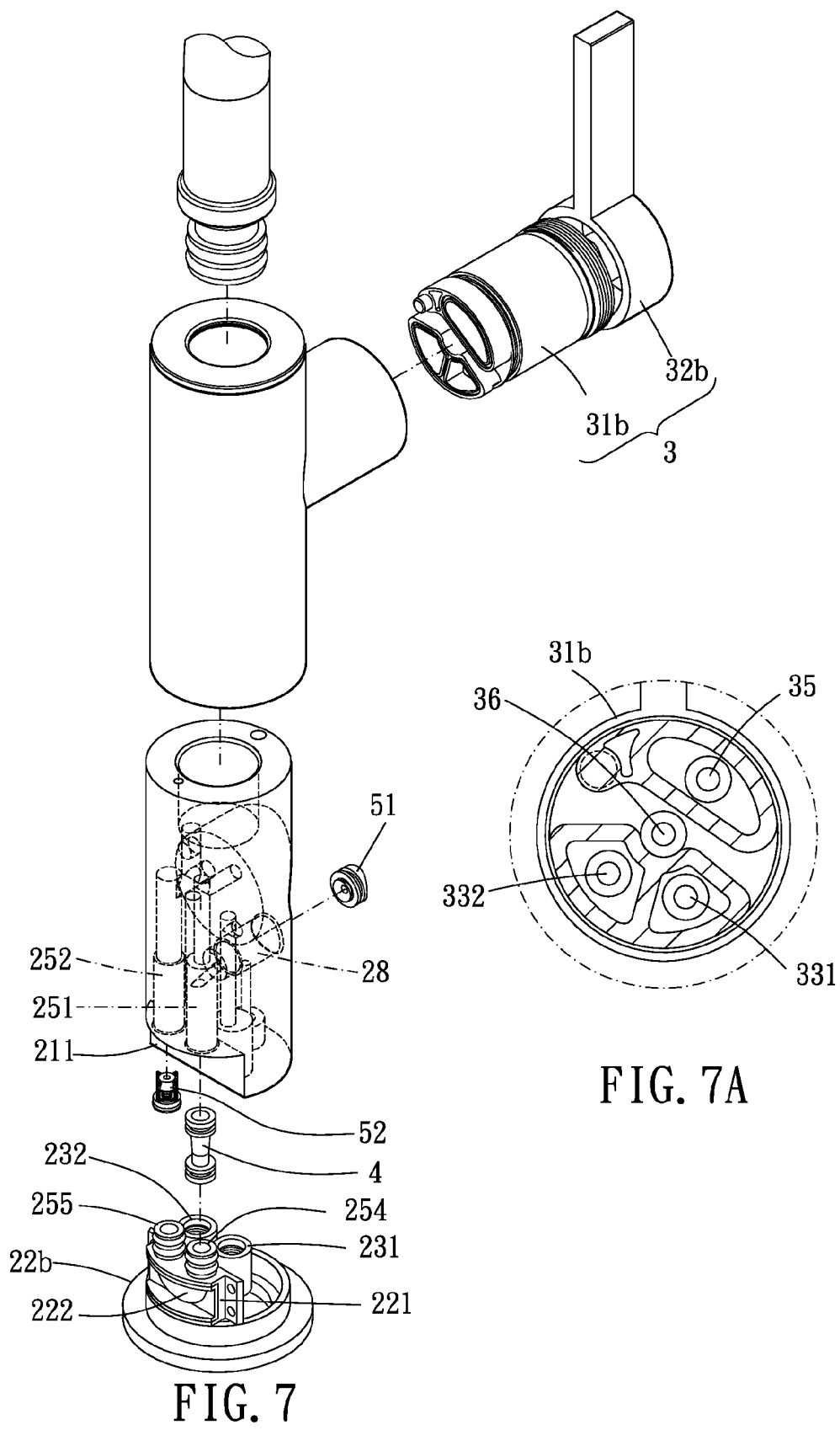
FIG. 7 is a breakdown drawing of the fluid mixing device in accordance with a third embodiment of the present invention.
FIG. 7a is a partial radial cross-sectional drawing of the fluid mixing device in accordance with the third embodiment of the present invention.

Please refer to FIGS. 7, 7a for a third embodiment of the present invention. Compared to the second embodiment, the inlet channel includes a cold water channel 231 communicating with a cold water source and a hot water channel 232 communicating with a hot water source. The bottom member 22b includes two openings respectively communicated with the cold water channel 231 and the hot water channel 232. The body is formed with a second channel 26 internally (shown in FIG. 6), and the second channel 26 communicates with the outlet channel. The shell 31b is formed with a second exit 36, and the shell 31b includes a cold water entrance 331 and a hot water entrance 332 uncommunicated with each other, and the cold water entrance 331 and the hot water entrance 332 are respectively communicated with the cold water channel 231 and the hot water channel 232. The first exit 35 and the second exit 36 respectively communicates with the first channel 25 and the second channel 26. When the water controlling valve 32b is located in the first position, a mixture flow of the cold water source and the hot water source flows out from the interior of the water controlling valve 32b via the first exit 35. When the water controlling valve is located in the second position, the mixture flow flows out from the interior of the water controlling valve 32b via the second exit 36 and flows into the second channel 26. The rest of the function is the same as the first embodiment. Compared with the second embodiment, the third embodiment includes the cold water channel 231 and the hot water channel 232 and they are able to mix with each other. The third embodiment also includes the first exit 35, the first channel 25, the second exit 36 and the second channel 26 and is selectable to add the gas into the mixture of the cold water and the hot water.

As a conclusion, the fluid mixing device is selectable to add the gas into the water and includes a Venturi tube structure which helps to add the gas into the water effectively and increases the gas content in the water to achieve a demand function.

Also, the fluid mixing device includes a arcuate portion in the first channel, and this design reduces the collision between the fluid and the wall, so that the fluid flows faster and the flowing of the fluid is stable, and the Venturi tube structure 4 has a good performance of adding the gas.

Moreover, the fluid mixing device includes a first check valve and a second check valve. The first check valve prevents the water from flowing into the gassing hole, and the second check valve prevents the water from flowing from the second portion to the first portion and reduces the possibility that the water flows into the gassing channel.

While we have shown and described various embodiments in accordance with the present invention, it should be clear to those skilled in the art that further embodiments may be made without departing from the scope of the present invention.

What is claimed is:

1. A fluid mixing device, comprising:
   a body, internally formed with at least one inlet channel for communicating with at least one water source, a first channel, an outlet channel communicating between the first channel and outside of the body, and a gassing channel communicating between the first channel and a gas source;
   a water controlling valve assembly, including a shell fluid-sealingly assembled on the body and a water controlling valve disposed in the shell, the shell being formed with at least one entrance and a first exit, the at least one entrance communicating with the at least one inlet channel, the first exit communicating with the first channel, the water controlling valve operable between a first position and a second position to control the flow of the water source to flow out from the interior of the water controlling valve via the first exit;
   a Venturi tube structure, disposed within the first channel, including a necked passage communicating with the first channel and a gassing hole communicating between the necked passage and the gassing channel;
   a first check valve, disposed in the body and inside the gassing channel to only allow a flow to flow toward the first channel; and
   a second check valve, disposed in the body and inside the first channel, disposed between the outlet channel and the necked passage to only allow a flow to flow toward the outlet channel;
   wherein when the water controlling valve is located in the first position, the interior of the water controlling valve communicates with the first exit, and the water flow passes through the necked passage and draws gas from the gas source through the gassing hole to come into the necked passage to mix with each other; when the water controlling valve is located in the second position, the interior of the water controlling valve is uncommunicated with the first exit.

2. The fluid mixing device as claimed in claim 1, wherein the at least one inlet channel includes a cold water channel communicating with a cold water source and a hot water channel communicating with a hot water source, the body is formed with a second channel internally, and the second channel communicates with the outlet channel; the shell is formed with a second exit, the at least one entrance includes a cold water entrance and a hot water entrance uncommunicated with each other, and the cold water entrance and the hot water entrance are respectively communicated with the cold water channel and the hot water channel; the second exit communicates with the second channel; when the water controlling valve is located in the first position, a mixture flow of the cold water source and the hot water source flows out from the interior of the water controlling valve via the first exit; when the water controlling valve is located in the second position, the mixture flow flows out from the interior of the water controlling valve via the second exit.

3. The fluid mixture as claimed in claim 1, wherein the body is formed with a second channel internally, and the second channel communicates with the outlet channel; the shell is formed with a second exit, and the second exit communicates with the second channel; when the water controlling valve is located in the second position, the interior of the water controlling valve communicates with the second exit.

4. The fluid mixing device as claimed in claim 1, wherein the body includes a main portion and a bottom member detachably assembled with the main portion, and the bottom member is formed with an opening of the at least one inlet channel and an opening of the gassing channel.

5. The fluid mixing device as claimed in claim 4, wherein the first channel includes a first portion, a second portion and a arcuate portion connecting between the first portion and the second portion, the first portion communicates with the first exit at one end, the second portion communicates with the outlet channel at one end, the arcuate portion is disposed at a bottom of the body.

6. The fluid mixing device as claimed in claim 5, wherein the bottom member is formed with a chunk member, the arcuate portion includes an entrance tubular section, an exit tubular section and a middle arcuate section connecting between the entrance tubular section and the exit tubular section, the entrance tubular section and the exit tubular section are disposed on the chunk member and respectively connected with the first portion and the second portion, a shell member is detachably assembled with the chunk member and constructs the middle arcuate section with the chunk member.

7. The fluid mixing device as claimed in claim 6, wherein the main portion is formed with an undercut portion, and the chunk member is assembled in the undercut portion.

8. The fluid mixing device as claimed in claim 1, wherein the horizontal position of the second check valve is equal to or lower than that of the gassing hole.

9. The fluid mixing device as claimed in claim 1, further including an outflow tubular member assembled to the body, wherein the interior of the outflow tubular member communicates with the outlet channel.

10. The fluid mixing device as claimed in claim 9, wherein the outflow tubular member is detachably assembled with the body.

* * * * *